US006987963B2

(12) United States Patent
Kouznetsov et al.

(10) Patent No.: US 6,987,963 B2
(45) Date of Patent: Jan. 17, 2006

(54) SYSTEM, METHOD AND COMPUTER PROGRAM PRODUCT FOR CONTENT/CONTEXT SENSITIVE SCANNING UTILIZING A MOBILE COMMUNICATION DEVICE

(75) Inventors: Victor Kouznetsov, Aloha, OR (US); Davide Libenzi, Hillsboro, OR (US); Michael C. Pak, Portland, OR (US); Yasutaka Urakawa, Yokohama (JP); Kenji Ishii, Yokohama (JP); Masanori Fujita, Yokohama (JP)

(73) Assignees: NTT DoCoMo, Inc., Tokyo (JP); Networks Associates Technology, Inc., Santa Clara, CA (US)

( * ) Notice: Subject to any disclaimer, the term of this patent is extended or adjusted under 35 U.S.C. 154(b) by 57 days.

(21) Appl. No.: 10/639,009

(22) Filed: Aug. 11, 2003

(65) Prior Publication Data
US 2004/0210645 A1 Oct. 21, 2004

Related U.S. Application Data

(60) Provisional application No. 60/463,853, filed on Apr. 17, 2003.

(51) Int. Cl.
*H04M 3/42* (2006.01)

(52) U.S. Cl. .................. 455/414.1; 455/575.1; 455/566

(58) Field of Classification Search .............. 455/414.1, 455/466, 575, 566, 575.1; 713/200, 188, 713/118, 220; 380/270; 709/203, 26, 104.1
See application file for complete search history.

(56) References Cited

U.S. PATENT DOCUMENTS 6,269,254 B1 * 7/2001 Mathis ....................... 455/557

| 6,792,543 | B2 | * | 9/2004 | Pak et al. | 713/200 |
| 2001/0014907 | A1 | * | 8/2001 | Brebner | 709/202 |
| 2002/0072347 | A1 | * | 6/2002 | Dunko et al. | 455/414 |
| 2002/0183051 | A1 | * | 12/2002 | Poor et al. | 455/418 |
| 2003/0074581 | A1 | * | 4/2003 | Hursey et al. | 713/201 |
| 2003/0079145 | A1 | * | 4/2003 | Kouznetsov et al. | 713/200 |
| 2003/0093409 | A1 | * | 5/2003 | Weil et al. | 707/3 |
| 2004/0025042 | A1 | * | 2/2004 | Kouznetsov et al. | 713/200 |
| 2004/0168070 | A1 | * | 8/2004 | Szor | 713/188 |

OTHER PUBLICATIONS

Copy of Office Action Summary from U.S. Appl. No. 10/639,136 which was mailed Dec. 8, 2004.

Copy of Office Action Summary from U.S. Appl. No. 10/639,088 which was mailed Dec. 16, 2004.

International Search Report from PCT Application No. PCT/US04/10570, mailed Mar. 15, 2005.

* cited by examiner

*Primary Examiner*—Temica Beamer
*Assistant Examiner*—Wayne Cai
(74) *Attorney, Agent, or Firm*—Zilka-Kotab, PC; Christopher J. Hamaty

(57) ABSTRACT

A system, method and computer program product are provided for scanning application program data utilizing a mobile communication device. Included is an application program installed on a mobile communication device capable of communicating via a wireless network. Such application program is adapted for performing tasks utilizing the mobile communication device. Associated therewith is a scanning subsystem in communication with the application program for scanning application data relating to the tasks performed by the application program. In use, the application program communicates information relating to the application data to the scanning subsystem to facilitate the scanning by the scanning subsystem.

24 Claims, 15 Drawing Sheets

1000

| Data Type | Meaning | Format | Description |
|---|---|---|---|
| MDO_DTYPE_HTML | HTML | TEXT | Scan for malicious content in HTML |
| MDO_DTYPE_URL | URL | *url-string* | Scan for URL with malicious content |
| MDO_DTYPE_EMAIL | E-mail Address | *email-string* | Scan for email-address with malicious intent |
| MDO_DTYPE_PHONE | Phone number | *phone-number* | Scan for phone number with malicious intent |
| MDO_DTYPE_JAVA | JAVA | binary | Scan for malicious JAVA code |
| MDO_DTYPE_TEXT | text data | n/a | Scan text data for malicious content |
| MDO_DTYPE_UNKNOWN | unknown | unknown | Scan for all malware types |

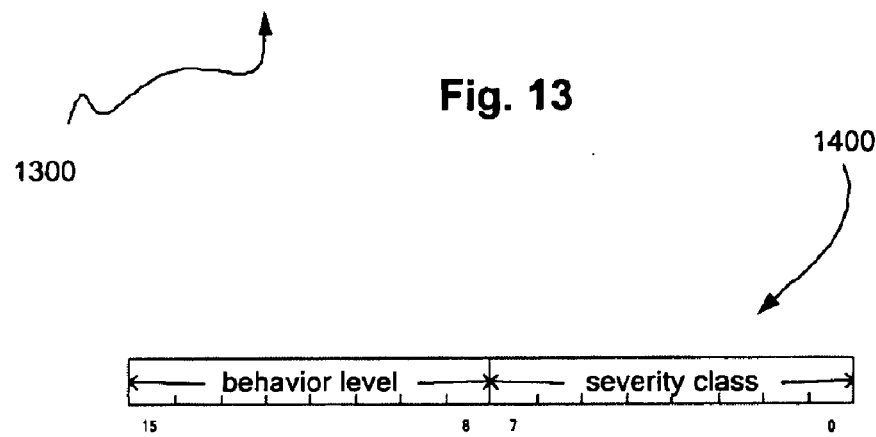

bits 31-16 are reserved

Fig. 14

| Terminal Application | Data to be Scanned | Scan Data Type | Scan Timing • - mandatory [1]  O - optional | | | | |
|---|---|---|---|---|---|---|---|
| | | | after receiving | before storing | before rendering | before invoking other app | other timing |
| Browser | URL | URL | | | | | •[2] |
| | HTML | HTML | O | O | • | | |
| | strings embedded in HTML | mail address, phone number, URL | | | | O | |
| Mailer | mail address | e-mail address | | | | | •[3] |
| | | phone number | | | | | •[3] |
| | message HTML | HTML | O | O | • | | O[3] |
| | strings embedded in mail text | mail address, phone number, URL | | | | O | |
| Message R/F | message text | HTML | O | O | • | | |
| | message HTML | HTML | O | O | • | | |
| | special strings embedded in message | mail address, phone number, URL | | | | O | |
| Java VM | Java | Java | O | O | | | •[4] |
| | special strings in JAVA | mail address, phone number, URL | | | | O | |
| Data Exchange | HTML, text, JAVA | HTML, text, JAVA | O | O | | | O[5] |
| | special strings embedded in data | mail address, phone number, URL | O | O | | | O[6] |
| Phone | phone number | phone number | | | | | •[7] |
| Others (e.g. scheduler) | HTML, text, JAVA | HTML, text, JAVA | | O | O | | |
| | special strings embedded in data | mail address, phone number, URL | O | O | O | O | |

1500

[1] specified applications data is to be scanned at the mandatory instances
[2] before HTTP request is made
[3] before sending a message
[4] before activation
[5] before sending data
[6] before sending data
[7] before calling

Fig. 15

SYSTEM, METHOD AND COMPUTER PROGRAM PRODUCT FOR CONTENT/CONTEXT SENSITIVE SCANNING UTILIZING A MOBILE COMMUNICATION DEVICE

This application claims priority from U.S. Provisional Patent Applications Ser. No. 60/463,853 filed on Apr. 17, 2003.

FIELD OF THE INVENTION

The present invention relates to mobile communication device security, and more particularly to scanning mobile communication devices for malware.

BACKGROUND OF THE INVENTION

The last decade has seen a rapid growth in the number and use of mobile cellular telephones. More recently, wireless devices have been introduced which combine the functionality of mobile telephones and Personal Digital Assistants (PDAs). It is expected that this area will undergo massive growth in the near future as new cellular telecommunication standards (i.e. GPRS, UMTS, and WAP) make possible the high speed transfer of data across the wireless interface.

It can be expected that such platforms will be susceptible to attack from so-called "malware" such as viruses, Trojan horses, and worms (referred to collectively hereinafter as "viruses"); and other unwanted/harmful content in much the same way as present day personal computers and workstations are susceptible. A number of mobile telephone viruses have already been identified.

In order to resist virus attacks, anti-virus software must be deployed into mobile platforms in much the same way as it has been deployed in the desktop environment. A number of different desktop anti-virus applications are currently available. The majority of these applications rely upon a basic scanning engine which searches suspect files for the presence of predetermined virus signatures. These signatures are held in a database which must be constantly updated to reflect the most recently identified viruses.

Typically, users download replacement databases every so often, either over the Internet, from a received e-mail, or from a CDROM or floppy disk. Users are also expected to update there software engines every so often in order to take advantage of new virus detection techniques which may be required when a new strain of virus is detected.

Mobile wireless platforms present a series of problems for software developers (including developers of anti-virus software). In particular, mobile wireless applications are traditionally not standardized, requiring a scanner to identify information about the application prior to any scanning operation being executed. Unfortunately, this information gathering takes its toll on the performance of the scanning process.

DISCLOSURE OF THE INVENTION

A system, method and computer program product are provided for scanning application program data utilizing a mobile communication device. Included is an application program installed on a mobile communication device capable of communicating via a wireless network. Such application program is adapted for performing tasks utilizing the mobile communication device. Associated therewith is a scanning subsystem in communication with the application program for scanning application data relating to the tasks performed by the application program. In use, the application program communicates information relating to the application data to the scanning subsystem to facilitate the scanning by the scanning subsystem.

In one embodiment, the scanning may include on-demand virus scanning and/or on-access virus scanning.

In another embodiment, the application program may include a mail application program, where the tasks include managing electronic mail. Further, the application program may include a browser application program, where the tasks include browsing a network. Still yet, the application program may include a phone book application program, where the tasks include managing a plurality telephone numbers. As an option, the application program may include a message application program, where the tasks include communicating messages. It should be noted that any type of application program may be included (i.e. a Java application program, etc.).

In still another embodiment, the information communicated to the scanning subsystem may relate to different types of the application data. Such types may include a hyptertext mark-up language (HTML)-type, a uniform resource locator (URL)-type, an electronic mail-type, a telephone number-type, a Java-type, a text-type, and/or an unknown-type.

As an option, the information may further identify a format associated with each of the types of the application data. This may be accomplished by equipping the information with variables that relate to the different types of the application data.

In still yet another embodiment, the information may indicate a timing of the scanning by the scanning subsystem. Such timing may be relative to the receipt of the application data, the storage of the application data, the rendering of the application data, and/or the invoking of the application data. Still yet, the information may indicate whether the scanning by the scanning subsystem is optional and/or mandatory.

Thus, the information may improve the timing of the scanning by the scanning subsystem. Moreover, the information may improve the accuracy of the scanning by the scanning subsystem.

BRIEF DESCRIPTION OF THE DRAWINGS

FIG. 13 illustrates various exemplary scan data types which the application programs are capable of communicating to the scanning subsystem via an API.

FIG. 14 shows a bit-field variable containing malware severity flags and application program behavior levels, in accordance with one exemplary embodiment.

FIG. 15 illustrates a chart setting forth the manner in which the timing of scanning by the scanning subsystem varies as a function of the data types identified via the variables of FIG. 13.

DETAILED DESCRIPTION

Figure 1:
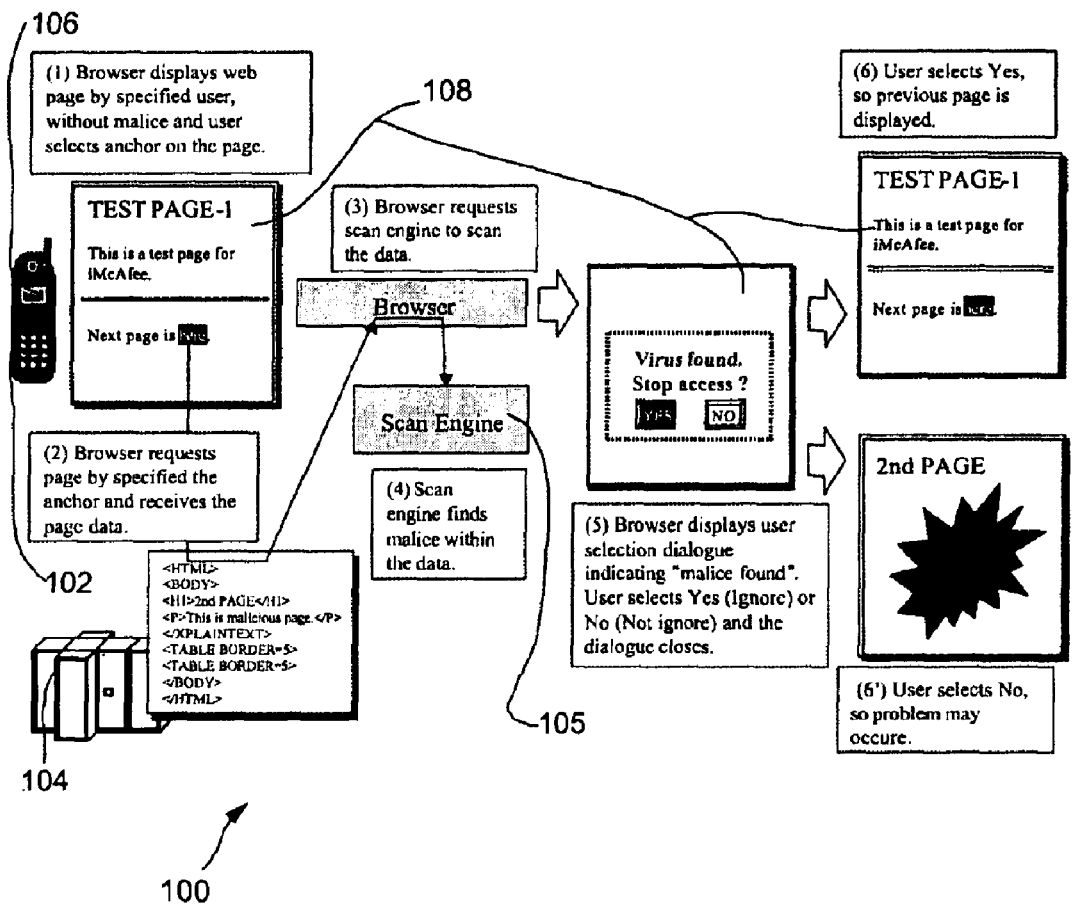
FIG. 1 illustrates a mobile communication framework, in accordance with one embodiment.

FIG. 1 illustrates a mobile communication framework 100, in accordance with one embodiment. As shown, included are a mobile communication device 102 and a backend server 104 capable of communicating via a wireless network. In the context of the present description, the mobile communication device 102 may include, but is not limited to a cellular telephone, a wireless personal digital assistant (PDA), a wireless hand-held computer, a wireless portable computer or any other mobile device capable of communication via a wireless network.

In one embodiment, the mobile communication device 102 may be equipped with a scanning subsystem 105. Such scanning subsystem 105 may include any subsystem capable of scanning data that is either stored on the mobile communication device 102 or in communication therewith. Of course, such scanning may refer to on-access scanning, on-demand scanning, or any other type of scanning. Moreover, the scanning may involve content (i.e. text, pictures, etc.) represented by the aforementioned data, general security-type scanning for malware, etc.

With continuing reference to FIG. 1, the mobile communication device 102 may be further equipped with a display 106 capable of depicting a plurality of graphical user interfaces 108 adapted for managing various functionality including the aforementioned scanning functionality.

In use, the display 106 of the mobile communication device 102 is used to display data on a network (i.e. the Internet, etc.). See operation 1. In the present course of use, the user may use the display 106 to browse various data on the network by selecting link or anchors for retrieving the data from the network via the backend server 104. See operation 2. Next, in operation 3, the scanning subsystem 105 is called to scan the retrieved data.

In the present instance, the scanning subsystem 105 is shown to have located malware in association with the retrieved data in operation 4. At this point, a user is provided with an option via the display 106 to either halt the retrieval and/or use/access the data regardless of the identified malware. Note operation 5. Based on the decision in operation 5, the user may or may not be the subject of an "attack," as indicated in operation 6.

Figure 2:
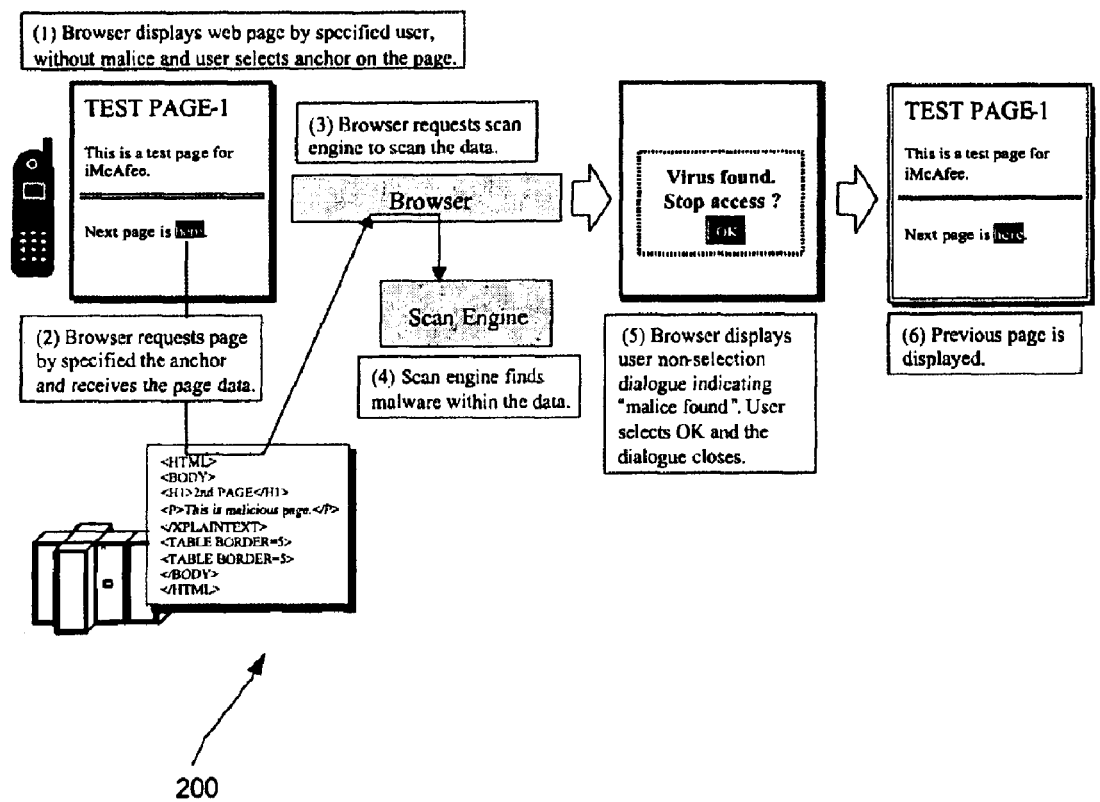
FIG. 2 illustrates a mobile communication framework, in accordance with another embodiment.

FIG. 2 illustrates a mobile communication framework 200, in accordance with another embodiment. The present mobile communication framework 200 is similar to the mobile communication framework 100 of FIG. 1 with the exception of the manner in which the mobile communication device reacts to the identification of malware in retrieved data.

In particular, the user is only provided with one option in operation 5. That is, the user is capable of only closing any dialogue associated with the data found to incorporate malware. Note operation 6.

Figure 3:
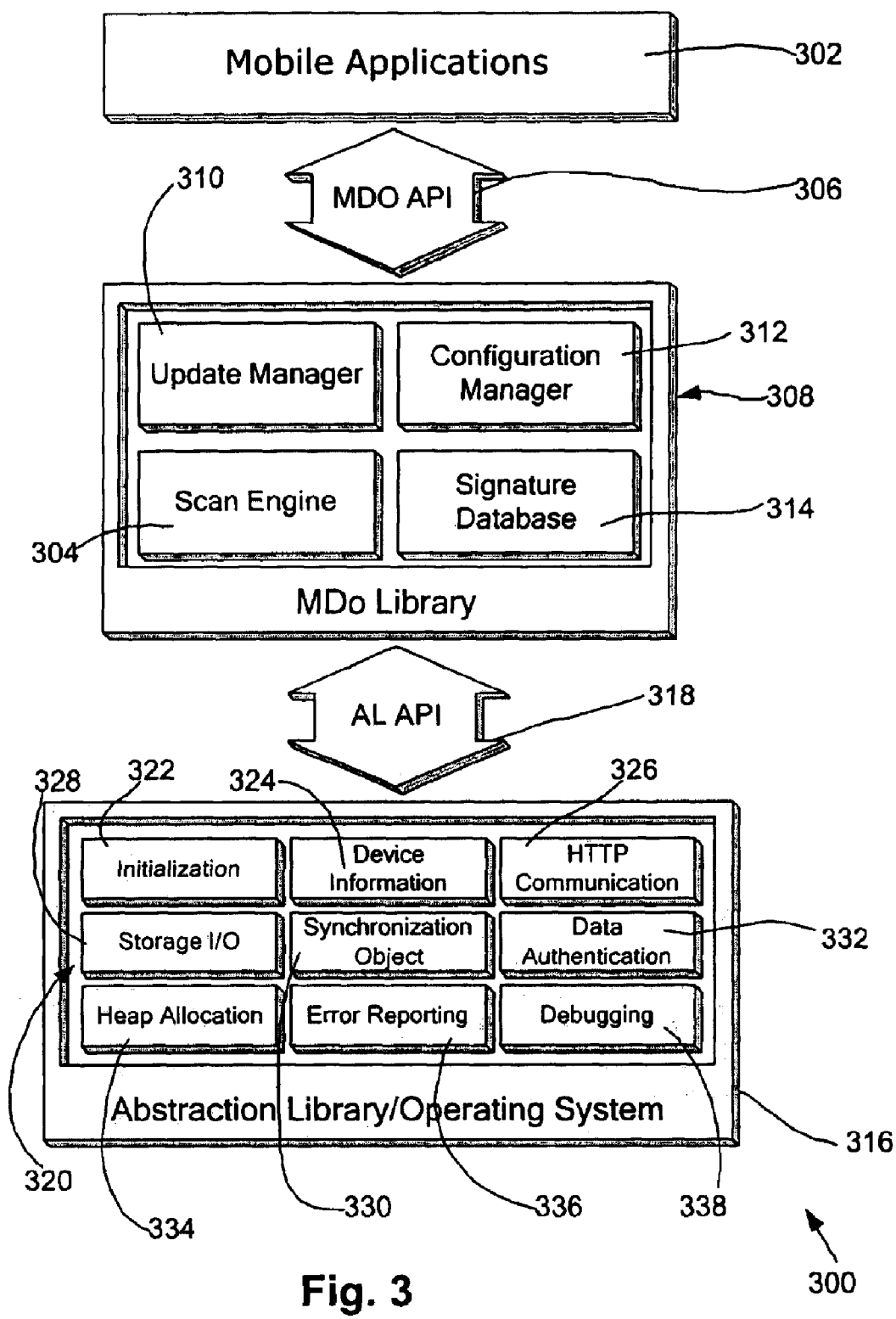
FIG. 3 illustrates an architecture associated with a mobile communication device, in accordance with one embodiment.

FIG. 3 illustrates an architecture 300 associated with a mobile communication device, in accordance with one embodiment. The present architecture 300 may be incorporated into the mobile communication devices of FIGS. 1 and 2. Of course, the architecture 300 may be implemented in any desired context.

As shown, the present architecture 300 may include a plurality of mobile application programs 302. In the context of the present description, the mobile application programs 302 may include any application program, software, etc. installed on a mobile communication device for carrying out various tasks. It should be further noted that such application programs 302 may also be implemented in firmware, hardware, etc. per the desires of the user.

In another embodiment, the application programs 302 may include, but are not limited to a mail application program, where the tasks include managing electronic mail. Further, the application program may include a browser application program, where the tasks include browsing a network. Still yet, the application program may include a phone book application program, where the tasks include managing a plurality telephone numbers. As an option, the application program may include a message application program, where the tasks include communicating messages. It should be noted that any type of application program may be included. For example, a Java application program or the like may be included.

With continuing reference to FIG. 3, a scanning subsystem 304 resides in communication with the application programs 302 via a first application program interface (API) 306 and a first library 308 associated with the scanning subsystem 304. More information regarding optional exemplary details relating to the first application program interface 306 and the first library 308 will be set forth later in greater detail during reference to FIGS. 4–12.

As an option, the application programs 302 may communicate information to the scanning subsystem 304 to facilitate the scanning by the scanning subsystem 304. Such information may relate to the type of data to be scanned, and the timing associated with such scanning. More exemplary information regarding the way in which the scanning subsystem 304 interacts with the application programs 302 in such a manner will be set forth during reference to FIGS. 13–15.

As shown in FIG. 3, the first library 308 may include an update manager 310, a configuration manager 312, and a signature database 314. In use, the update manager 310 may manage the process with which the signature database 314 is updated with the latest signatures for scanning purposes. In one embodiment, the update process may be streamlined to accommodate the limited bandwidth inherent in mobile communication frameworks. More exemplary information regarding such update process will be set forth during reference to FIGS. 16–17.

Further provided as a component of the architecture 300 of FIG. 3 is an operating system 316 installed on the mobile communication device and adapted for executing the application programs 302. In one embodiment, the scanning subsystem 304 may be platform-independent, and thus be capable of being implemented on any type of operating system/mobile communication device combination.

To accommodate this feature, a second application program interface 318 and a second library 320 capable of supporting various functionality such as system/library initialization 322, error functions 336, memory allocation 334, input/output (I/O) 328, data authentication 332, synchronization 330, hypertext transfer protocol 326, device information 324, debugging 338, and other functionality (i.e. shared memory, system time, etc.). In one embodiment, the second application program interface 318 may be platform independent, similar to the scanning subsystem 304. More information regarding optional exemplary details relating to the second application program interface 318 and the second library 320 will be set forth later in greater detail during reference to Appendix A.

Figure 4:
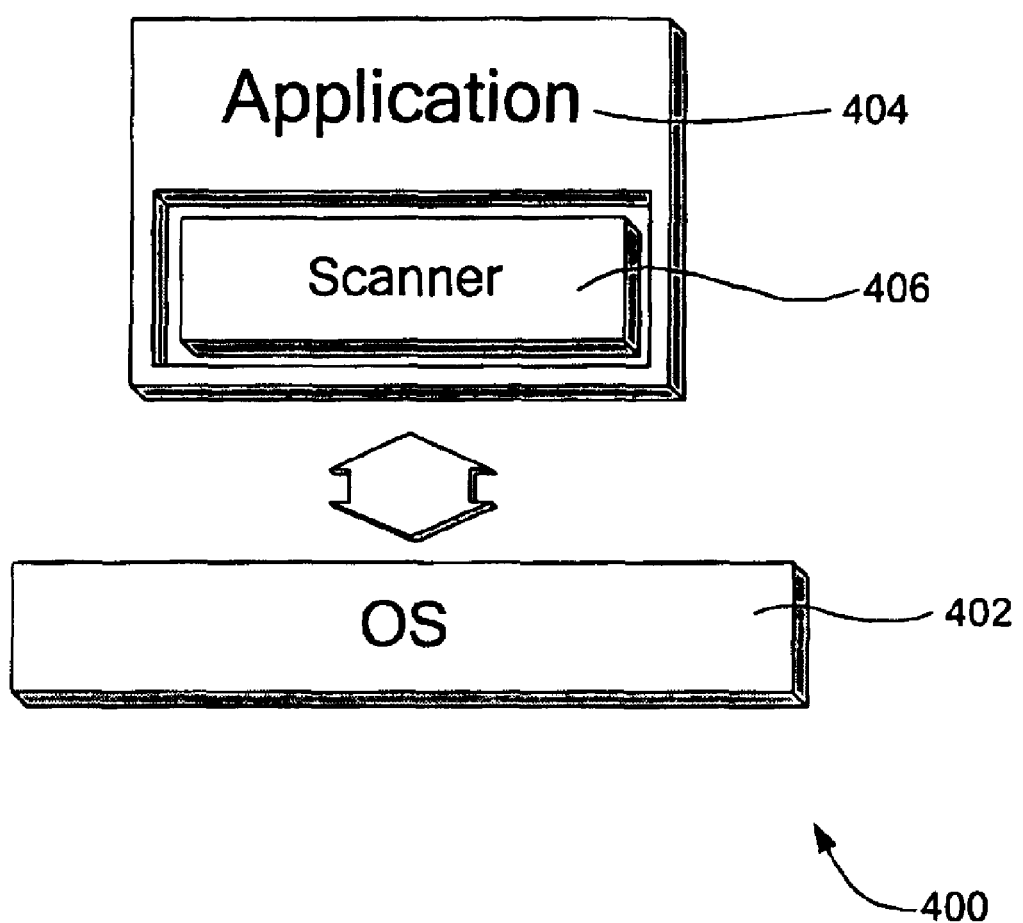
FIG. 4 shows a system for accessing security or content analysis functionality utilizing a mobile communication device, in accordance with one embodiment.

FIG. 4 shows a system 400 for accessing security or content analysis functionality utilizing a mobile communication device, in accordance with one embodiment. In one example, the present system 400 may be implemented in the context of the application programs, scanning subsystem, and operating system of the architecture 300 of FIG. 3. It should be noted, however, that the present system 400 may be implemented in any desired context.

As shown, included is an operating system 402 installed on a mobile communication device capable of communicating via a wireless network. Further provided is an application program 404 installed on the mobile communication device and executed utilizing the operating system 402 for performing tasks.

A scanning subsystem 406 remains in communication with the application program 404 via an application program interface and an associated library (see, for example, the first application program interface 306 and first library 308 of FIG. 3). Such scanning subsystem 406 is adapted for accessing security or content analysis functionality in conjunction with the tasks performed by the application program 404. In one embodiment, the security or content analysis may include security analysis. In another embodiment, the security or content analysis may include content analysis. Still yet, the security or content analysis may include on-demand virus scanning and/or on-access virus scanning.

In use, the security or content analysis functionality may be applied to application data associated with the tasks performed by the application program 404. In the context of the present description, the application data may include any data input, processed, output, or otherwise associated with the performance of the tasks carried out by the application program 404.

By the tight coupling of the scanning subsystem 406 and application program 404 via the application program interface, less overhead and code redundancies are required. More exemplary information regarding such application program interface and the associated library will be set forth hereinafter in greater detail during reference to subsequent figures.

Figure 5:
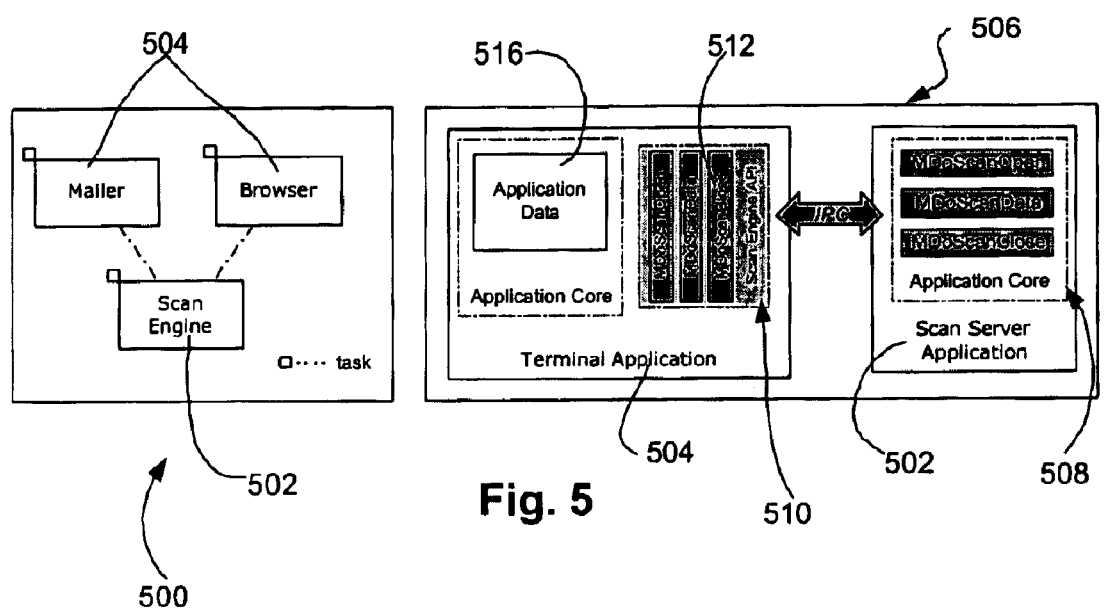
FIG. 5 shows a framework for accessing security or content analysis functionality utilizing a mobile communication device, in accordance with an application server embodiment of the system of FIG. 4.

FIG. 5 shows a framework 500 for accessing security or content analysis functionality utilizing a mobile communication device, in accordance with an application server embodiment of the system 400 of FIG. 4. It should be noted that the present framework 500 may be implemented in any desired context.

As shown, the scanning subsystem may include a scanning program 502 that communicates with the application program 504 via the application program interface 506 and an associated protocol (i.e. uItron messaging system). As will be set forth in greater detail later, the application program interface 506 may involve a first component 508 associated with the scanning program 502 and a second component 510 associated with the application program 504.

Various calls 512 provided with the application program interface 506 may include an open call, a data call, and a close call. In use, the scanning program 502 may scan application data 516 associated with the tasks performed by the application program 504.

Figure 6:
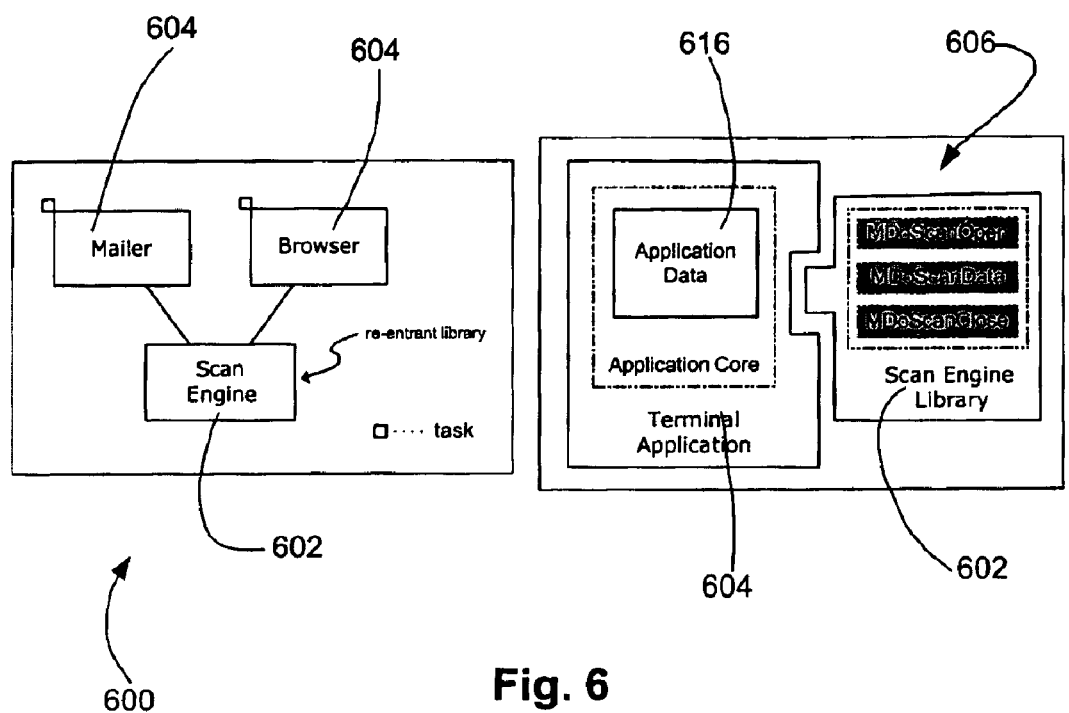
FIG. 6 shows a framework for accessing security or content analysis functionality utilizing a mobile communication device, in accordance with a re-entrant library embodiment of the system of FIG. 4.

FIG. 6 shows a framework 600 for accessing security or content analysis functionality utilizing a mobile communication device, in accordance with a re-entrant library embodiment of the system 400 of FIG. 4. It should be noted that the present framework 600 may be implemented in any desired context.

As shown, the scanning subsystem may include a re-entrant library 602. In use, the scanning subsystem re-entrant library 602 may be linked to an application program 604 at run-time. Thus, an application program interface 606 may be populated into each of a plurality of application programs 604.

Similar to the previous framework 500 of FIG. 5, the application program interface 606 may involve various calls 612 including an open call, a data call, and a close call. In use, the re-entrant library 602 may be used to scan application data 616 associated with the tasks performed by the application program 604.

Figure 7:
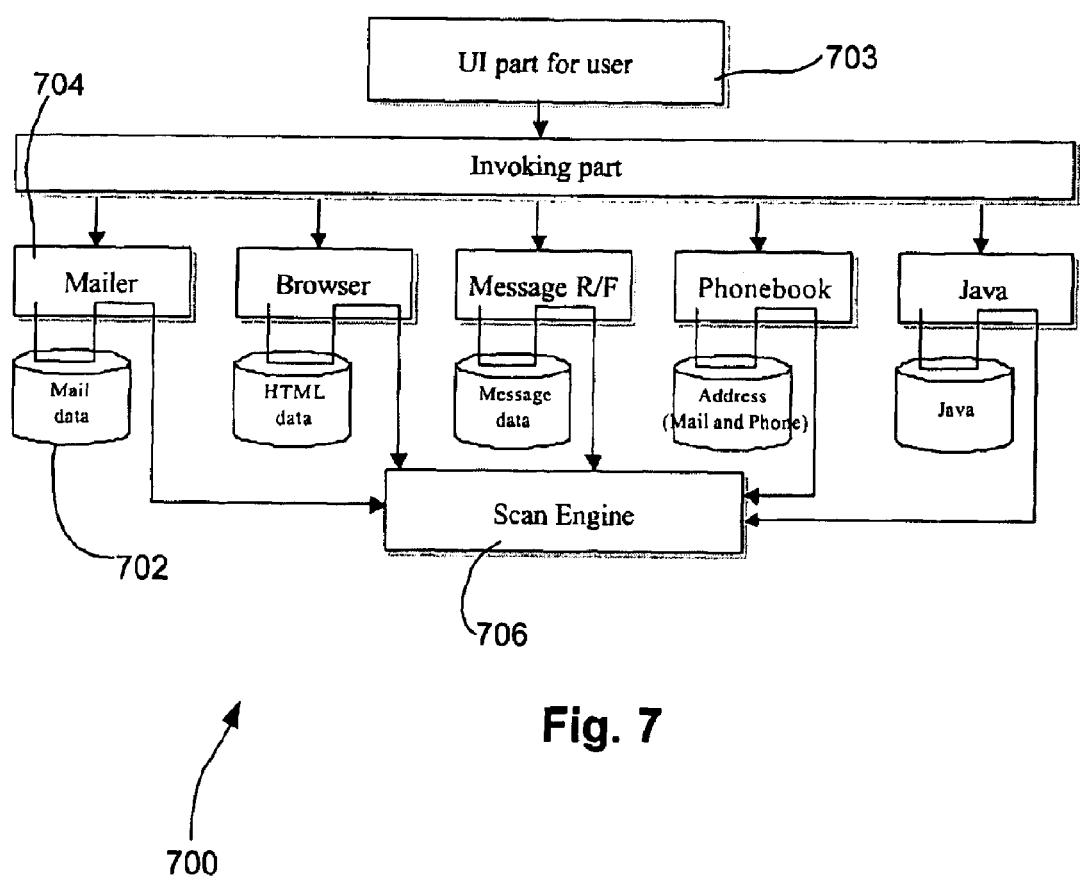
FIG. 7 shows an on-demand scanning system implemented in the context of the system of FIG. 4.

FIG. 7 shows an on-demand scanning system 700 implemented in the context of the system 400 of FIG. 4. It should be noted that the present system 700 may be implemented in any desired context.

On-demand scanning provides scanning of stored application data 702 for malicious content or code for removal. The user may initiate on-demand scanning via a user interface 703. Moreover, each application program 704 may call a scanning subsystem 706 to perform scanning of objects stored in the corresponding memory.

On the other hand, on-access scanning provides identification of malicious code or content before the application program 704 processes or renders the application data 702. The on-access scanning is transparent to the user until the scanning subsystem 706 detects malicious application data 702.

Figure 8:
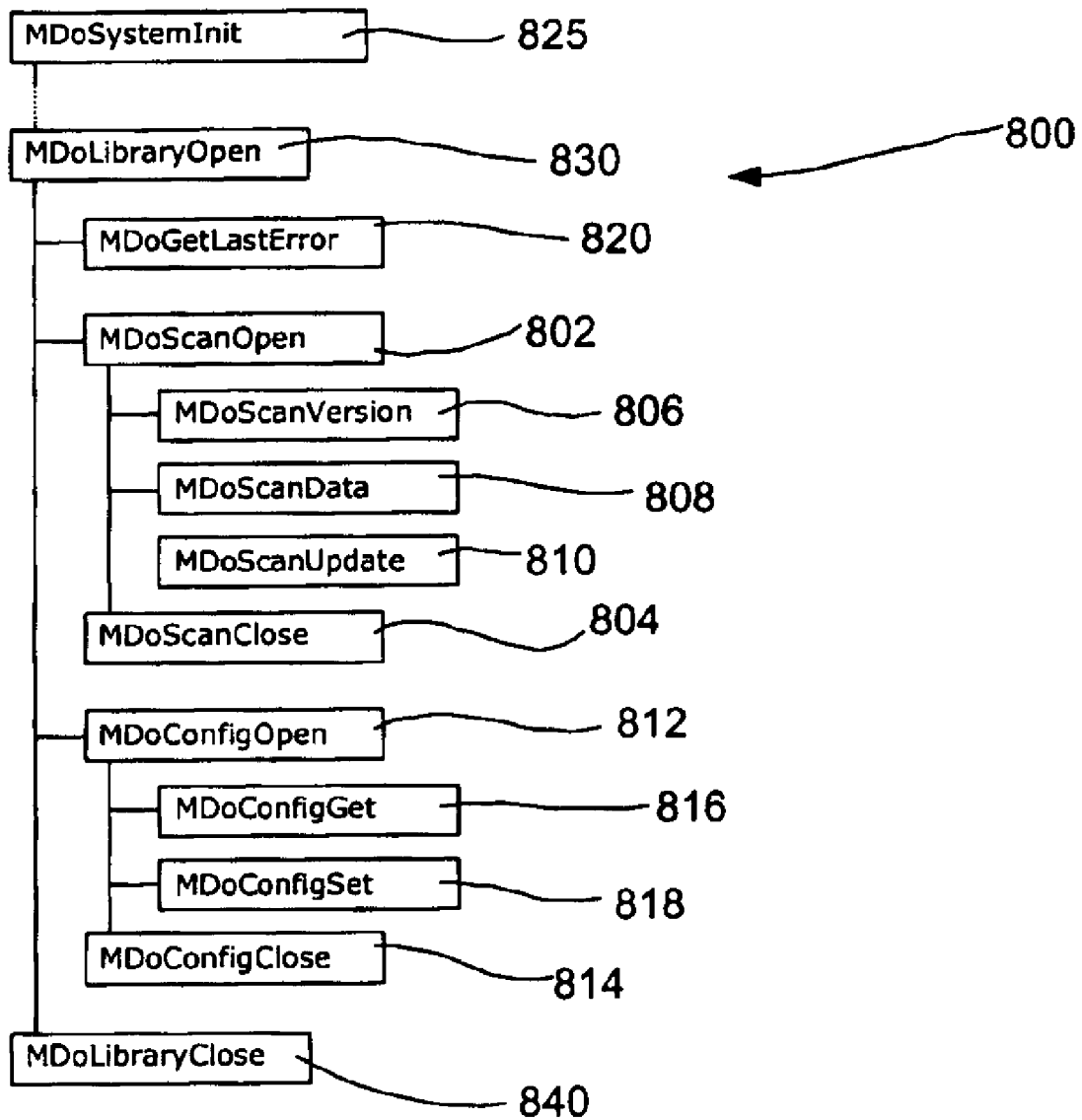
FIG. 8 shows a hierarchy of various components of an application program interface (API) which may be used to interface mobile application programs and a scanning subsystem, in accordance with one embodiment.

FIG. 8 shows a hierarchy of various components of an application program interface 800 which may be used to interface mobile application programs and a scanning subsystem, in accordance with one embodiment. As an option, the present application program interface 800 may be implemented in the context of the system 400 of FIG. 4. It should be noted, however, that the present application program interface 800 may be implemented in any desired context.

As shown in FIG. 8, the application program interface functions include MDoScanOpen( ) 802, MDoScanClose( ) 804, MDoScanVersion( ) 806, and MDoScanData( ) 808. MoDoScanOpen( ) 802 and MDoScanClose( ) 804 are used to create/open and close a scanning subsystem object instance. MDoScanVersion( ) 806 provides scanning subsystem and signature pattern data version information. MDoScanData( ) 808 performs content/data scanning and reporting. Also included in the scanner application program interface is MDoScanUpdate( ) 810 that provides malware signature database and detection logic updates. When MDoScanUpdate( ) 810 is called by an update application, the library connects to a remote back-end server (see, for example, FIG. 1) and downloads the latest files (i.e. mdo.sdb, mdo.pd).

Scanning subsystem configuration is done using the MDoConfigOpen( ) 812, MDoConfigClose( ) 814, MDoConfigGet( ) 816, and MDoConfigSet( ) 818. Once a configuration handle is obtained by calling the present application program interface 800, the calling application program uses the get and set configuration API to query and set scanning subsystem configuration variables.

Also included in the present application program interface 800 is an error retrieval function named MDoGetLastError( ) 820. This function is used to retrieve information about the last error that occurred.

Before any of the API calls are made, preferably at boot-time, MDoSystemInit( ) 825 is called to initialize the library environment settings. The library keeps configuration settings, malicious code detection logic (i.e. mdo.pd) and signature database (i.e. mdo.sdb), and internal variables (i.e. synchronization objects, etc.) at fixed persistent storage locations.

MDoLibraryOpen( ) 830 and MDoLibraryClose( ) 840 are used to initialize the library. An application program may call MDoLibraryOpen( ) 830 before any other API calls are made, and the application program may call MDoLibraryClose( ) 840 before terminating.

The application program interface 800 may be capable of supporting various functionality such as system environment initialization, version status information retrieval, updating the scanning subsystem, scanning, configuring the scanning subsystem, etc. using various application program interface components. More information will now be set forth regarding the foregoing functionality in the context of the application program interface 800.

System Initialization

MDoSystemInit( ) 825 performs validation and environment initialization for data kept at specific persistent storage locations. A malicious code/content signature pattern database (i.e. mdo.sdb), detection logic (i.e. mdo.pd), configuration settings, and synchronization objects may be stored at these locations. MDoSystemInit( ) 825 may be called once (i.e. at boot-time) before any of the API functions are executed.

Table #1 illustrates exemplary information regarding MDoSystemInit( ) 825.

TABLE #1

MDoSystemInit
Description
Verify and initialize system environment information.
Prototype
int MDoSystemInit( void );
Parameters
none
Return Value
0 if successful, non-zero error code otherwise.

Library Interface API

Figure 9:
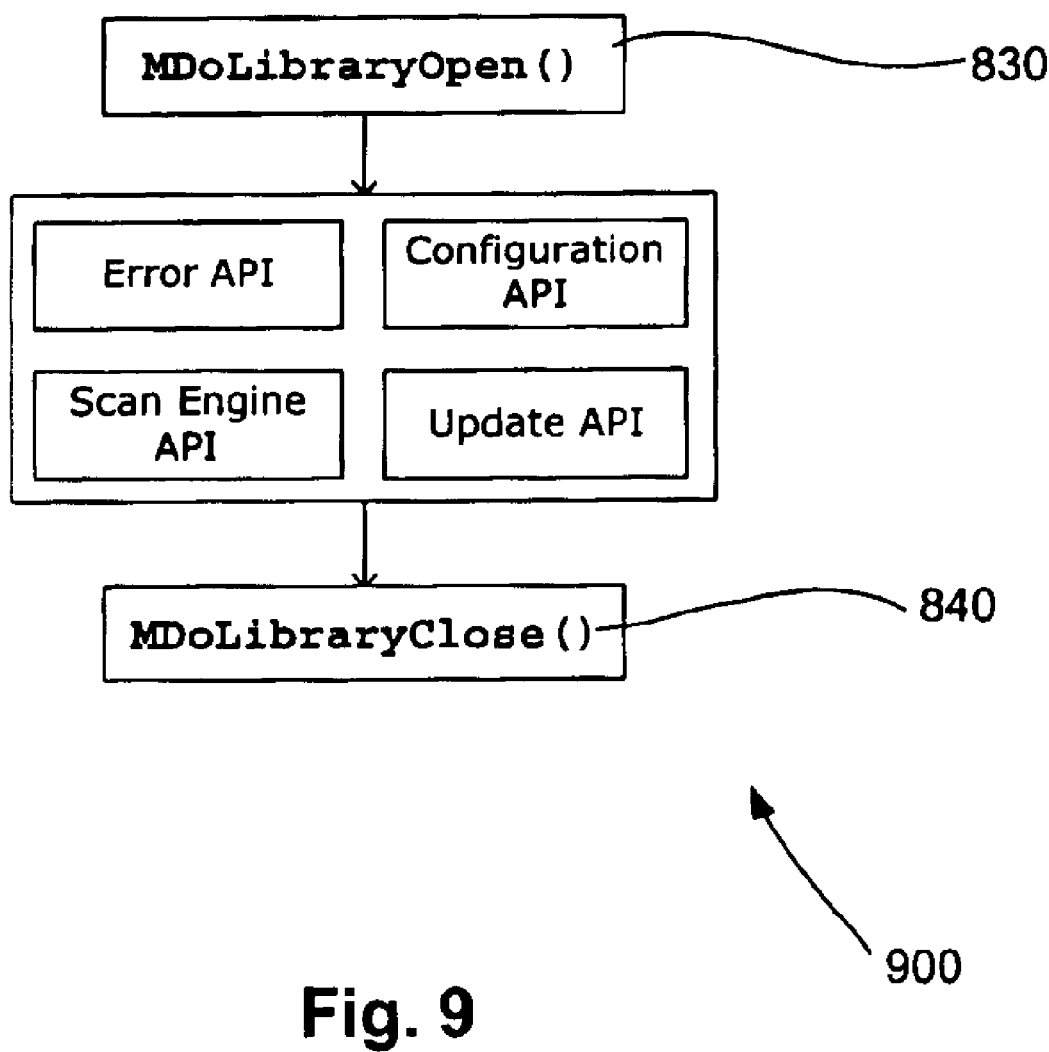
FIG. 9 illustrates an exemplary library interface initialization.

The application program interface 800 includes a plurality of library interface components. The API interface instantiation may be accomplished using MDoLibraryOpen( ) 830. The instantiated library interface handle obtained using this function may be used for subsequent API calls. Before the application program terminates, MDoLibraryClose( ) 840 may be called to release the handle. FIG. 9 illustrates an exemplary library interface initialization 900 utilizing MDoLibraryOpen( ) 830 and MDoLibraryClose( ) 840.

Table #2 illustrates exemplary information regarding MDoLibraryOpen( ) 830.

TABLE #2

MDoLibraryOpen
Description
Initializes and returns an API library interface handle.
Prototype
MDOLIB_HANDLE MDoLibraryOpen( void );
Parameters
none
Return Value
library interface handle if successful,
INVALID_MDOLIB_HANDLE otherwise.
See Also
MDoLibraryClose( )

Table #3 illustrates exemplary information regarding MDoLibraryClose( ) 840.

TABLE #3

MDoLibraryClose
Description
Releases system resource associated with an API library handle returned by the MDoLibraryClose( ) function.
Prototype
void MDoLibraryClose( MDOLIB_HANDLE hLib );
Parameter
hLib
[in] library handled returned by MDoLibraryOpen.
Return Value
none
See Also
MDoLibraryOpen( )

Error Retrieval

Once the library has been successfully initialized and instantiated by MDoLibraryOpen( ) 830, MDoGetLastError( ) 820 provides the application program with information about the last error occurred.

Table #4 illustrates exemplary information regarding MDoGetLastError( ) 820.

TABLE #4

MDoGetLastError
Description
Returns the specified library instance's last-error value.
Prototype
MDoErrorCode MDoGetLastError(MDOLIB_HANDLE hLib);
Parameters
hLib
[in] library handled returned by MDoLibraryOpen.

Return Value

Figure 10:
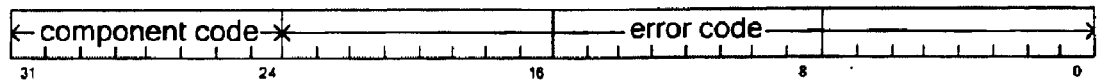
FIG. 10 illustrates an exemplary format of an error code functionality, in accordance with one embodiment.

The MDoErrorCode data type may be defined as a 32-bit unsigned integer which contains both component and error codes. Often times, the error information retrieved may be set at the platform abstraction API layer. For this reason, the MDoErrorCode format given herein is similar to AlError-Code format defined by the abstraction layer API (See Appendix A). FIG. 10 illustrates an exemplary format 1000 of MDoErrorCode, in accordance with one embodiment.

Table #5 illustrates exemplary information regarding MDoGetLastError( ) 820.

TABLE #5

MDoErrorCode is defined as:
typedef unsigned long MDoErrorCode;
See Also
MDoLibraryOpen( ), MDoScanOpen( ), MDoScanData( ), MDoScanUpdate( )

Exemplary Computer Code #1 illustrates a sample library calling sequence with a call to MDoGetLastError( ) 820.

Computer Code #1

```
MDOLIB_HANDLE hLib;
MDOSCAN_HANDLE hScanner;
MDoErrorCode errCode;
.
.
hMDoLib = MDoLibraryOpen();
if( hMDoLib == INVALID_MDOLIB_HANDLE )
{
    return( -1 );
}
```

-continued

Computer Code #1

```
.
.
hScanner = MDoScanOpen( hLib );
if( hScanner == INVALID_MDOSCAN_HANDLE )
{
    errCode = MDoGetLastError( hLib );
    ReportError( errCode );
    MDoLibraryClose( hMDoLib );
    return( -1 );
}
.
.
MDoScanClose( hScanner .);
MDoLibraryClose( hMDoLib );
.
.
```

Error Codes

An error code reported by MDoGetLastError 820 includes two parts: component code and error code. See Appendix A for more information. Table #6 lists exemplary error codes and corresponding component codes. MDoGetLastError 820 also returns error codes set at the abstract library layer. It should be noted that the following list is for illustrative purposes only and should not be construed as limiting in any manner.

TABLE #6

| Component Code | Error Code | Description |
| --- | --- | --- |
| MDO_ERROR_MODULE | MDOE_CFG_UNKNOWN_VARIABLE | Unknown/invalid configuration variable name. |
| ML_ERROR_MODULE | MLE_XFILE_SEEK_MODE | Invalid meta file seek mode value. |
|  | MLE_XFILE_SEEK_OOB | Invalid meta file seek location. |
|  | MLE_XFILE_SIZE_OOB | Invalid meta file size. |
|  | MLE_PKG_INVALID_FILE | Invalid update package file. |
|  | MLE_PKG_INVALID_FORMAT | Invalid update package file format. |
|  | MLE_SDB_INVALID_POSITION | Invalid SDB record position. |
|  | MLE_SDB_INVALID_STRUCTURE | Invalid/corrupt SDB record structure. |
|  | MLE_SDB_RECORD_NOT_FOUND | Missing SDB record. Record not found. |
|  | MLE_SDB_NO_INODES | No more SDB INode space. |
|  | MLE_SDB_NO_BLOCKS | No more SDB block space. |
|  | MLE_SDB_INVALID_OFFSET_SIZE | Invalid SDB offset. |
|  | MLE_SDB_BAD_INITIALIZE_PARAMS | Invalid SDB initialization parameter(s). |
|  | MLE_ME_INVALID_SUBTYPE | Invalid sub-record ID value. |

TABLE #6-continued

| Component Code | Error Code | Description |
|---|---|---|
| | MLE_ME_INVALID_TYPE | Invalid sub-record ID value. |
| | MLE_ME_TYPE_NOT_FOUND | Unknown sub-record ID value. |
| | MLE_ME_VIRUS_NOT_FOUND | Missing/invalid virus code. |
| | MLE_DBU_INVALID_COMMAND | Invalid SDB update command. |
| | MLE_ME_SMALL_VREC_ARRAY | Bad virus-record array size. |
| | MLE_ME_TOO_MANY_WVSELECT_BUCKETS | Failed to add new SDB record. |
| | MLE_ME_BACKPTR_OVERFLOW | Failed to update SDB record. |

Scanning Subsystem API

Figure 11:
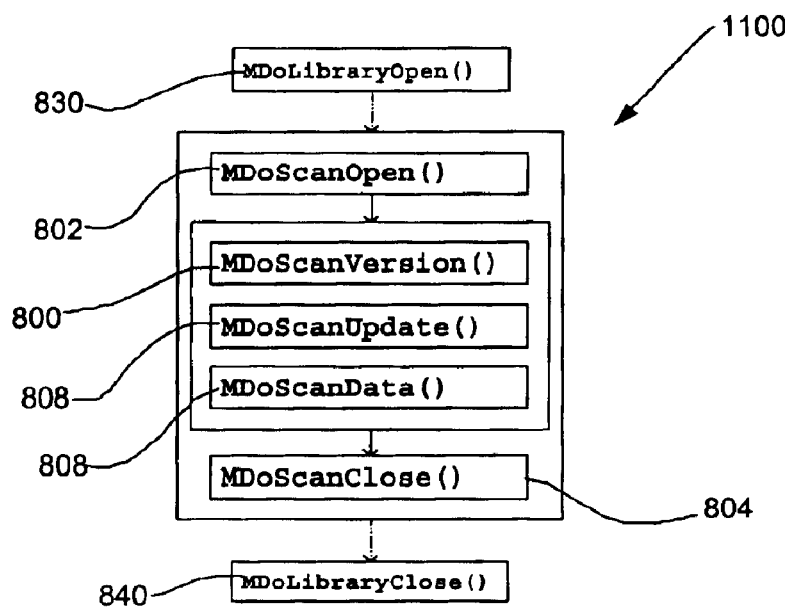
FIG. 11 illustrates a scanning subsystem API call sequence, in accordance with one embodiment.

The application program interface 800 includes a plurality of scanning subsystem components. The scanning subsystem API components provide data/content scanning and signature update service. Included are MDoScanOpen( ) 802, MDoScanClose( ) 804, MDoScanVersion( ) 806, MDoScanUpdateo 810, and MDoScanData( ) 808. MDoScanOpen( ) 802 is used for scanning subsystem object instantiation. MDoScanVersion( ) 806 provides scanning subsystem and signature database version information. MDoScanUpdate( ) 810 performs the signature database update. MDoScanData( ) 808 performs malicious code/content data scanning. FIG. 11 illustrates a scanning subsystem API call sequence 1100, in accordance with one embodiment.

MDoScanOpen

Table #7 illustrates exemplary information regarding MDoScanOpen( ) 802.

TABLE #7

Description
Returns a scanning subsystem instance handle.
Prototype
MDOSCAN_HANDLE MDoScanOpen( MDOLIB_HANDLE hLib );
Parameters
hLib
[in] library handle obtained using the
MDoLibraryOpen( ) function.
Return Value
Scanning subsystem instance handle if successful.
INVALID_MDOSCAN_HANDLE is returned if error.
See Also
MDoScanClose( ), MDoScanData( ), MDoScanUpdate( ),
MDoLibraryOpen( )

MDoScanClose

Table #8 illustrates exemplary information regarding MDoScanClose( ) 804.

TABLE #8

Description
Releases scanning subsystem instance and associated system resource.
Prototype
void MDoScanClose( MDOSCAN_HANDLE hScan );

TABLE #8-continued

Parameters
hScan
[in] Scanning subsystem handle obtained using the
MDoScanOpen( ) function.
Return Value
none
See Also
MDoScanOpen( ), MDoScanData( ), MDoScanUpdate( )

MDoScanVersion

Table #9 illustrates exemplary information regarding MDoScanVersion( ) 806.

TABLE #9

Description
Obtain the scanning subsystem and signature version information from a scanner handle returned by the MDoScanOpen( ) function.
Prototype
int MDoScanVersion( MDOSCAN_HANDLE hScan,
                    SVerInfo*    pVersion );
Parameters
hScan
[in] Scanning subsystem handle obtained using the
MDoScanOpen( ) function.
pVersion
[out] Pointer to a structure contain version information.
Return Value
0 if successful, −1 otherwise.
See Also
MDoScanOpen( ), MDoScanClose( ), MDoScanData( ),
MDoScanUpdate( )

Exemplary Computer Code #2 illustrates a sample version information structure.

Computer Code #2

```
/* version information consists of
    <device id> + <MDo> + <PD> + <SDB>
   For example:
       device id:  "Win32TestPlatformRev05"
```

Computer Code #2 (continued)

```
        MDo:      1
        mdo.pd:   2
        mdo.sdb:  32
*/
#define MDO_DEVID_MAX 32
typedef struct
{
    char szDevID[MDO_DEVID_MAX];   /* device id */
    unsigned int uMDoVer;          /* version */
    unsigned int uEngVer;          /* detection logic
(mdo.pd) version */
    unsigned int uSDbVer;          /* signature database
(mdo.sdb) version */
} SVerInfo;
```

The mobile communication device identification string reported by MDoScanVersion( ) 806 is set using the device identification string returned by AlDevGetInfo. (See Appendix A).

MDoScanData

Table #10 illustrates exemplary information regarding MDoScanData( ) 808.

TABLE #10

Description
MDoScanData is to be called from an application program to scan a specific data type. The calling application program specifies the scanner action, the scan target data type, a set I/O functions to access the data, and an optional callback function. The result of the data scanning is returned in a caller provided data structure. MDoScanData is re-entrant.
Prototype
int MDoScanData(    MDOSCAN_HANDLE    hScan,
                    SScanParam*       pParam,
                    SScanResult*      pResult );
Parameters
hScan
[in] Scanning subsystem handle obtained from a call to the MDoScanOpen( ) function.
pParam
[in] Pointer to a structure containing data scan parameters.
pResult
[out] Pointer to a structure containing data scan results.
Return Value
0 if successful, −1 otherwise and error code is set.
See Also
MDoScanOpen( ), MDoScanClose( ), MDoScanVersion( ), MDoScanUpdate( )

MDoScanUpdate

Table #11 illustrates exemplary information regarding MDoScanUpdate( ) 810.

TABLE #11

Description
Performs malicious code/content signature pattern database (mdo.sdb) and detection logic (mdo.pd) update.
Prototype
int MDoScanUpdate(   MDOSCAN_HANDLE   hScan,
                     SUpdateParam*    pParam );
Parameters
hScan
[in] scan handle obtained using the MDoScanOpen( )

TABLE #11-continued function.
pParam
[in] Pointer to an update parameter structure containing a callback function pointer for update cancellation/abort and progress status update.

Exemplary Computer Code #3 illustrates the manner in which the update parameter structure is defined.

Computer Code #3

```
typedef struct SStatus_struct
{
    int  iCurrent;
    int  iTotal;
} SStatus;
typedef struct SUpdateParam_struct
{
    void* pPrivate;
    int (*pfCallBack) (void *pPrivate, int iReason, void
*pParam);
} SUpdateParam;
```

The calling application program may set the function pointer and the data to be passed to the function when calling the function. Note Table #12.

TABLE #12

| Callback Reason (iReason) | Description |
|---|---|
| MDO_UCB_STATUS | Callback is made to report update status. pParam points to the SStatus structure. SStatus.iCurrent contains amount of data received and iTotal reports the total update data size in bytes. |
| MDO_UCB_CANCEL | Callback is made to see if update cancellation is set. pParam points NULL. |

Configuration API

The application program interface 800 includes a plurality of configuration components. Included is a set of functions used to retrieve and specify the scanning subsystem settings. One goal of these functions is to provide application programs and the scanning subsystem with centralized runtime configuration access. The configuration data is stored in non-volatile persistent data storage (i.e. flash memory, etc.).

Figure 12:
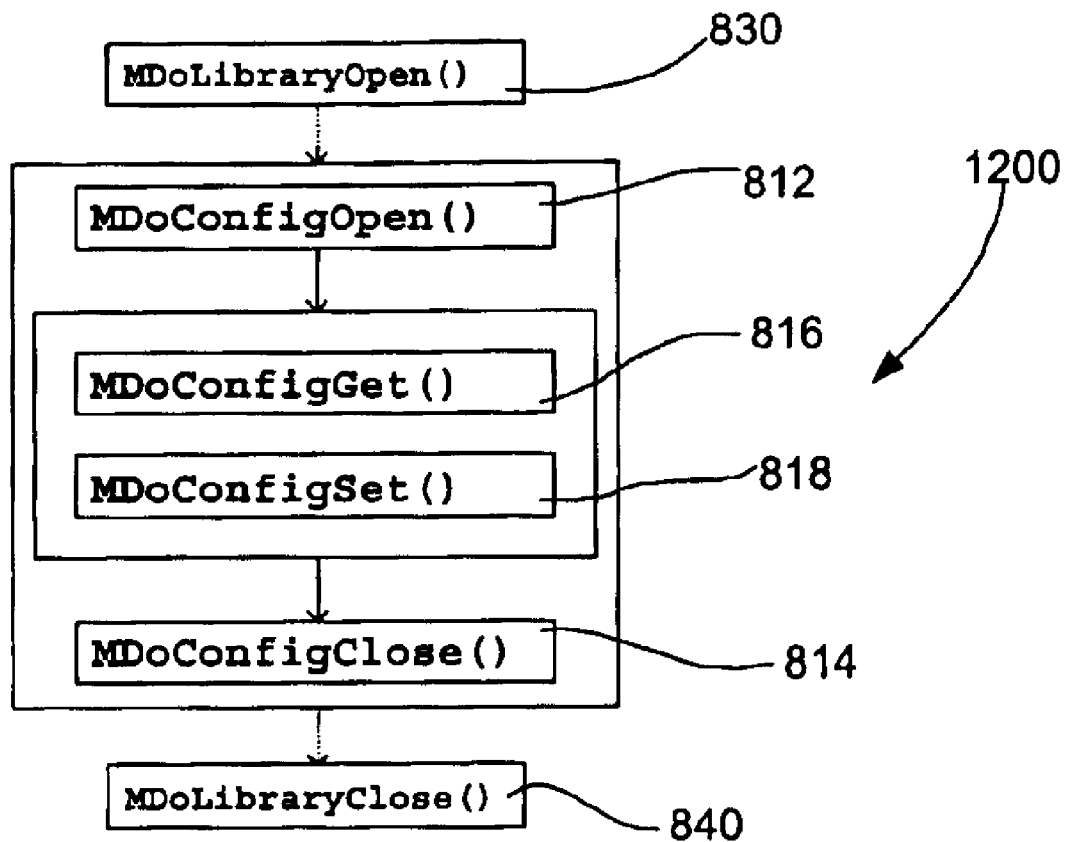
FIG. 12 illustrates one exemplary configuration API call sequence, in accordance with one embodiment.

FIG. 12 illustrates one exemplary configuration API call sequence 1200, in accordance with one embodiment. As shown, MDoConfigOpen( ) 830 returns a handle to be passed to the configuration retrieval and specification functions. MDoConfigClose( ) 814 is used to release and close the configuration handle returned by MDoConfigOpen( ) 812. MDoConfigSet( ) 818 sets a specified configuration variable with a specified value, and MDoConfigGet( ) 816 returns a configuration value for a specified variable. Configuration variable(s) settings modified by MDoConfSet( ) 818 is not necessarily saved to the permanent storage until MDoConfigClose( ) 814 is called. Application programs may call configuration open, get or set, and immediately follow with the close function when accessing and/or specifying a variable value.

The configuration variables and values specified/retrieved using the configuration components of the application program interface 800 may be represented in null-character ('\0') terminated, 8-bit character strings. Table #13 lists available configuration variables.

TABLE #13

| Configuration Variable | Value/Example | Description |
| --- | --- | --- |
| "ScanEnable" | "0" | disable scanning |
|  | "1" | enable scanning |
| "UpdateURL" | "http://update.mcafeeacsa.com/504i" | Base-URL for signature for update (see section 0) |

MDoConfigOpen

Table #14 illustrates exemplary information regarding MDoConfigOpen( ) 812.

TABLE #14

Description
Returns a handle to a configuration setting to be passed to subsequent calls to MDoConfigGet( ) and MDoConfigSet( ).
Prototype
MDOCONFIG_HANDLE MDoConfigOpen( MDOLIB_HANDLE hLib );
Parameters
hLib
[in] library handle obtained using the MDoLibraryOpen ( ) function.
Return Value
Configuration handle if successful.
INVALID_MDOCONFIG_HANDLE is returned if error.
See Also
MDoConfigClose( ), MDoConfigSet( ), MDoConfigGet( )

MDoConfigClose

Table #15 illustrates exemplary information regarding MDoConfigClose( ) 814.

TABLE #15

Description
Releases system resource and closes configuration handle.
Prototype
void MDoConfigClose( MDOCONFIG_HANDLE hConfig );
Parameters
hConfig
[in] Configuration handle returned by the MDoConfigOpen( ) function.
Return Value
none
See Also
MDoConfigOpen( ), MDoConfigSet( ), MDoConfigGet( )

MDoConfigGet

Table #16 illustrates exemplary information regarding MDoConfigGet( ) 816.

TABLE #16

Description
Obtain a configuration value for the specified configuration variable.
Prototype
int MDoConfigGet ( MDOCONFIG_HANDLE   hConfig
                    char const*        pszName,
                    char*              pBuffer,
                    unsigned int       uSize ) ;

TABLE #16-continued

Parameters
hConfig
[in] Configuration handle returned by the MDoConfigOpen( ) function.
pszName
[in] NULL-terminated configuration variable name.
pBuffer
[out] NULL-terminated configuration setting/value for the variable specified
uSize
[in] Length of pBuffer in bytes.
Return Value
0 if successful, −1 otherwise.
See Also
MDoConfigOpen( ), MDoConfigClose( ), MDoConfigSet( )

MDoConfigSet

Table #17 illustrates exemplary information regarding MDoConfigSet( ) 818.

TABLE #17

Description
Set a value for the specified configuration variable.
Prototype
int MDoConfigGet ( MDOCONFIG_HANDLE   hConfig
                    char const*        pszName,
                    char const*        pszValue ) ;
Parameters
hConfig
[in] Configuration handle returned by the MDoConfigOpen( ) function.
pszName
[in] NULL-terminated configuration variable name.
pszValue
[int] NULL-terminated new configuration setting/value for the variable specified
Return Value
0 if successful, −1 otherwise.
See Also
MDoConfigOpen( ) , MDoConfigClose( ) , MDoConfigGet( )

Application Program/Scanning Subsystem Communication to Facilitate Scanning

As mentioned earlier, the application programs may communicate information to the scanning subsystem to facilitate the scanning by the scanning subsystem. This communication may be facilitated via the API described above. The foregoing information may relate to the type of data to be scanned, and the timing associated with such scanning. More description regarding the manner in which the above API accomplishes such will now be set forth.

Scan Parameters (SScanParam)

The calling application program may supply the scanning subsystem with a scanning parameter using the SScanParam structure. The information contained in the scan parameter provides the scanning subsystem with: 1) scanning subsystem action type (i.e. iAction), 2) the scan data type (i.e. the type of the application data to be scanned—iDataType), 3) data pointer to the scan target (i.e. pPrivate), 4) function to retrieve the data size in bytes (i.e. pfGetSize), 5) function to resize the scan data (i.e. pfSetSize), 6) function used by the scanning subsystem to retrieve a block of scan data (i.e. pfread), 6) function used to write to the scan data (i.e. pfWrite), and 7) call-back function for scanning subsystem status/progress reporting (i.e. pfCallBack).

Exemplary Computer Code #4 illustrates a data scan parameter structure.

```
Computer Code #4 typedef struct SScanParam__struct
{
    int         iAction;
    int         iDataType;
    void*       pPrivate;
    unsigned int    (* pfGetSize) ( void* pPrivate );
    int             (* pfSetSize) ( void* pPrivate,
                                    unsigned int uSize );
    unsigned int    (* pfRead) (    void* pPrivate,
                                    unsigned int uOffset,
                                    void* pBuffer,
                                    unsigned int uCount );
    unsigned int    (* pfWrite) (   void* pPrivate,
                                    unsigned int uOffset,
                                    void const* pBuffer,
                                    unsigned int uCount );
    int             (* pfCallBack) (void* pPrivate,
                                    int iReason,
                                    SCBArg const*
                                    pCBArg );
} SSCanParam;
```

Scan Action (iAction)

The scan action specifies the type of scanning to be performed on supplied application data. Table #18 illustrates various exemplary scan actions.

TABLE #18

| Scan Action ID | Description |
| --- | --- |
| MDO_SA_SCAN_ONLY | The scanning subsystem performs scanning and reports malicious code found. No repairing will be performed. |
| MDO_SA_SCAN_REPAIR | After performing scanning, object containing malicious code will be repaired. |

Scan Data Type (iDataType)

The calling application program may inform the scanning subsystem of the application data type and format using this variable.

FIG. 13 illustrates various exemplary application data types 1300 which the application programs are capable of communicating to the scanning subsystem via the API. The unstring format may conform to the Uniform Resource Locators (RFC 1738) specification. The email-string format may conform with the Internet E-mail address format (RFC 822) specification. The default domain may be set to any desired domain. Still yet, the phone-number string may include the numeric characters '0' through '9', and the '#' and '*' characters.

Scan Data Pointer/Handle (pPrivate)

A pointer (or handle) to an application scan object is further provided. The scanning subsystem does not necessarily perform direct memory I/O using this data pointer/handle. The data pointer/handle is passed back to the caller to perform read/write using the caller specified I/O functions.

Scan Data Size (pfGetSize)

The present function is used by the scanning subsystem to obtain the scan target data size (in bytes) from the calling application program.

Scan Data Resize (pfSetSize)

This function is used by the scanning subsystem to request the calling application program to resize the application data being repaired/cleaned to a given size (in bytes). This function may be used in conjunction with the scan-and-repair/delete option.

Scan Data Read Function (pfread)

The instant function may be used by the scanning subsystem to read a specified amount of application data from the calling application program.

Scan Data Write Function (pfWrite)

This is an optional parameter which may be used by the scanning subsystem to write a specified amount of application data to the scan object as a part of the repair process. This function pointer may be set if the scan-action is set for repair or deletion.

Callback Function (pfCallBack)

If specified, the scanning subsystem calls the specified function with the information described in below table. The callback function, if returned with a negative return value, aborts the scanning process. Table #19 sets forth an exemplary callback code list.

TABLE #19

| Callback Reason ID | Description |
| --- | --- |
| MDO_CB_DETECTED | Informs the calling application program a malicious code has been detected in the scan target. The callback data argument 'arg' is set to pointer to a SCBArg structure. |
| MDO_CB_CLEAN_READY | Informs the calling application program identified malware is ready to be cleaned/repaired. The callback data argument 'arg' is set to pointer to a SCBArg structure. |

Exemplary Computer Code #5 illustrates a scanning subsystem callback structure.

```
Computer Code #5 typedef struct SCBArg__struct
{
    text_t const* pszName;      /* detected malware name */
    text_t const* pszVariant;   /* detected malware's variant name */
    unsigned int uType;         /* malware type */
} SCBArg;
```

Scan Result (SScanResult)

The result of object scanning, detected malware information, is returned to the calling application program in the SScanResult structure provided by the calling application program. The SScanResult structure contains a pointer to a structure that contains scan result information, and a pointer to a function used to remove the scan result resource. The memory used to hold the scan result is allocated by the scanning subsystem and freed by calling the function pointed by the pfDeleteResult pointer.

Exemplary Computer Code #6 illustrates a sample calling sequence.

```
Computer Code #6 int ScanAppData( ... )
{
    SScanResult scanResult;
    .
    .
    if (MDoScanData( hScanner, &scanParam,
        &scanResult ) == 0)
```

-continued

Computer Code #6

```
{
        .
        .
        scanResult.pfFreeResult( &scanResult );
    }
        .
        .
}
```

Exemplary Computer Code #7 illustrates a detected malicious code/content information structure.

Computer Code #7

```
typedef struct SDetected_struct
{
    struct SDetected_struct* pNext;
                                    /* pointer to next malware found */
                                    /* NULL if at the end of list */
    text_t const* pszName;          /* detected malware name */
    text_t const* pszVariant;       /* detected malware's variant name */
    unsigned int  uType;            /* detected malware type */
    unsigned int  uBehavior;        /* bit-field specifiying severity */
                                    /* class and behavior level */
} SDetected;
```

Exemplary Computer Code #8 illustrates a scan result structure.

Computer Code #8

```
typedef struct SScanResult_struct
{
    int         iNumDectected;      /* number of malware found */
    SDetected*  pList;              /* detected malware list */
    /* function ptr used to free reported scan result */
    void (* pfFreeResult) ( struct SScanResult_struct* pResult );
} SScanResult;
```

Severity Class and Behavior Level (uBehavior)

FIG. 14 shows a bit-field variable 1400 containing malware severity flags and application program behavior levels included in the SDetect structure, in accordance with one exemplary embodiment.

Table #20 sets forth an exemplary malware severity class list.

TABLE #20

| Severity Flag | Description |
|---|---|
| MDO_SC_USER | Detected malware is harmful to the user. |
| MDO_SC_TERMINAL | Detected malware is harmful to the device. |

The scanning subsystem sets the MDO_SC_USER flag, if the scanned application data contains malware harmful to the user of the mobile communication device. MDO_SC_TERMINAL flag is set if it is harmful to the mobile communication device itself. Both MDO_SC_USER and MDO_SC_TERMINAL flags are set if it is harmful to both the user and the mobile communication device.

The application program behavior level specifies what to do with the application data containing the detected malware. Table #21 lists the behavior level values and corresponding actions by the application program.

TABLE #21

| Behavior Level | Description |
|---|---|
| MDO_BC_LEVEL0 | Process with a warning. This severity level may be assigned to data previously considered malicious. |
| MDO_BC_LEVEL1 | Prompt the user before processing. Ask the user if he/she wants the application to process the data. |
| MDO_BC_LEVEL2 | Do not process the data. |
| MDO_BC_LEVEL3 | Do not process the data and prompt user for removal. If the content is stored on the device, prompt the user for permission before removal. |
| MDO_BC_LEVEL4 | Do not process the data and automatically remove if stored. |

When multiple malicious codes are found in a scanned application data, the calling application program is expected to act with the highest behavior level. For example, if both MDO_BC_LEVEL0 and MDO_BC_LEVEL3 are reported, the application program may take on MDO_BC_LEVEL3 actions.

FIG. 15 illustrates a chart 1500 setting forth the manner in which the timing of scanning by the scanning subsystem varies as a function of the data types identified via the variables of FIG. 13.

Signature Database Update

As mentioned earlier, the update process may be streamlined to accommodate the limited bandwidth inherent in mobile communication frameworks. More information regarding the various ways that this may be accomplished will now be set forth.

Updated Components

The MDoScanUpdate function provides two components [i.e. malicious code detection logic (mdo.pd) and signature database (mdo.sdb)] with update service. One component (i.e. mdo.pd) may contain the detection logic and be updated fully when a newer version is available. Another component (i.e. mdo.sdb) may be updated incrementally up to n previous versions. A full update for the second component may be performed on mobile communication devices with versions older than n. For example, if n is set to 5, and the latest version is 20, then a full update is performed on mobile communication devices with a version older than 15.

Activation via User Interface

Figure 16:
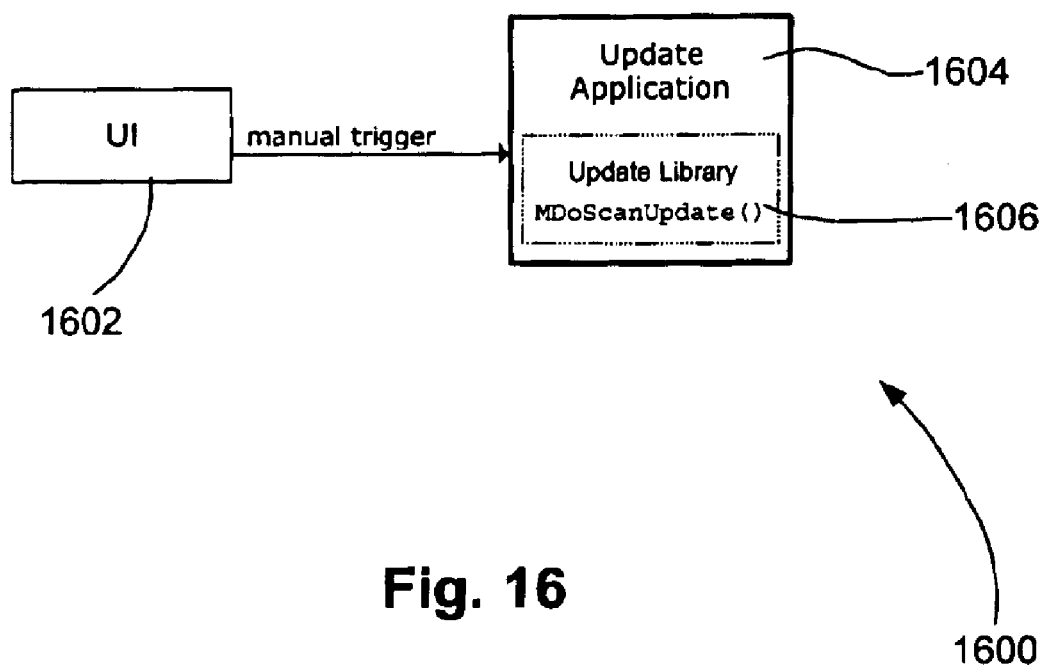
FIG. 16 illustrates an exemplary flow describing the manner in which the update is initiated by a user interface, in accordance with one embodiment.

FIG. 16 illustrates an exemplary flow 1600 describing the manner in which the update is initiated by a user interface, in accordance with one embodiment. As shown, the virus pattern update may be initiated by the mobile communication device user by selecting a menu entry via a user interface 1602. Once the user selects the update menu, an update application 1604 is activated and connects to a back end server via the appropriate update interface function 1606.

Communication Protocol

The update library may communicate with the back end server via HTTP protocol.

Update Process

Figure 17:
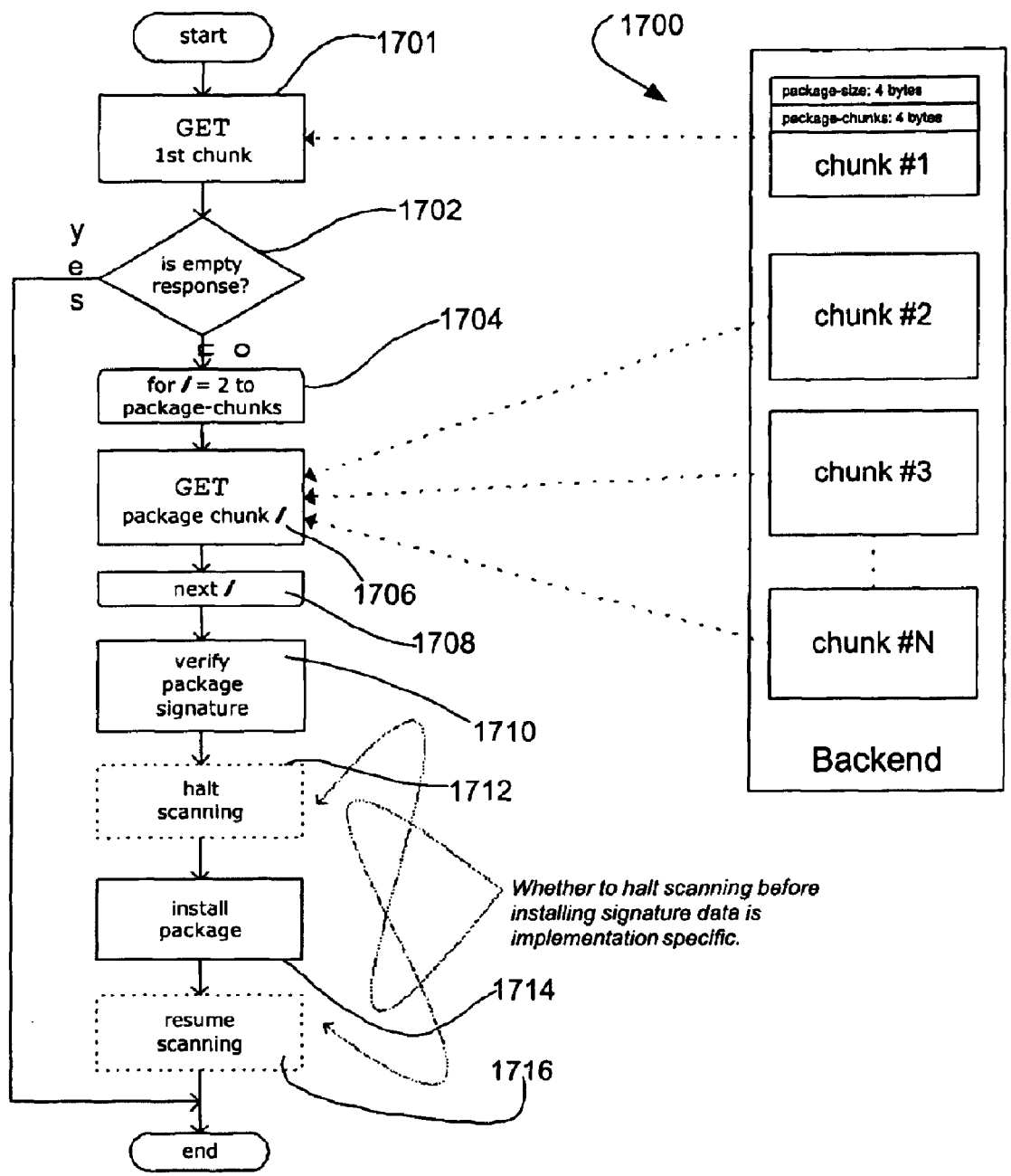
FIG. 17 illustrates a method for efficiently updating a scanning subsystem of a mobile communication device, in accordance with one embodiment.

FIG. 17 illustrates a method 1700 for efficiently updating a scanning subsystem of a mobile communication device, in accordance with one embodiment. In one embodiment, the present method 1700 may be implemented in the context of the application programs, scanning subsystem, and operating system of the architecture 300 of FIG. 3 and systems of FIGS. 1 and 2. It should be noted, however, that the present method 1700 may be implemented in any desired context.

To initiate the process, a request for an update may be sent from at least one mobile communication device to a backend server. Of course, in other embodiments, the update may be sent without a request.

In one embodiment, the update may be requested by the mobile communication device utilizing a request data structure. Optionally, such data structure may include variables such as a uniform resource locator (URL) variable, mobile communication identifier variable, an application program interface version variable, a detection logic variable, a signature version variable, and/or a portion number variable.

Table #22 illustrates an exemplary URL that may be used for such purpose.

TABLE #22

<BASE-URL>?dev=<DEV-ID>&mdo=<MDO-VER>
&eng=<ENG-VER>&sdb=<SDB-VER>&chk=<CHUNK>
Below is a table that describes the above URL variables

| Variable | Description |
| --- | --- |
| <BASE-URL> | update server URL obtained using the MDoConfigGet function (see section 0) |
| <DEV-ID> | Mobile communication device identifier; returned by the AlDevGetInfo function. |
| <MDO-VER> | MDo API version |
| <ENG-VER> | detection logic, mdo.pd, version |
| <SDB-VER> | signature database, mdo.sdb, version |
| <CHUNK> | update package chunk, or portion, number; one (=1) initially |

Table #23 illustrates a specific example of a URL that conforms with the above description.

TABLE #23 http://update.mcafeeacsa.com/504i?dev=X504i05&mdo=2&eng=3&sdb=56&chk=1

The above URL of Table #23 specifies base-URL "http://update.mcafeeacsa.com/504i", "X504i05" as the device identifier, API version 2, malicious code detection logic version 3, and signature database version 56. It should be noted that the "chunk," or portion, number may be set to 1 when the mobile communication device initially contacts the back end server. Also, the base-URL may be obtained using the MDoConfigGet API using the "UpdateURL" configuration variable.

After receiving the request, the back end server determines which update package needs to be downloaded by comparing stored malicious code detection logic and signature database versions with the version information encoded in the URL.

If no update is needed, the backend returns a no-content response. In operation 1701, the mobile communication device receives the response as the first portion. If it is determined that the first portion includes the foregoing no-content response (see decision 1702), the method 1700 is terminated, as there is no update to download. Such feature is beneficial in accommodating the limited bandwidth inherent in mobile communication frameworks.

On the other hand, if the first portion of an update package is returned, the method 1700 is continued by receiving additional portions of the update subsequent to (or possibly in parallel with) the receipt of the first portion of the update. Note operations 1704–1708. It should be noted that the first portion may be accompanied with the total package size and portion count information.

To download the remaining update portions, the portion number of the download URL may be modified. Table #24 illustrates a specific example of a URL that specifies portion number "3."

TABLE #24 http://update.mcafeeacsa.com/504i?dev=X504i05&mdo=2&eng=3&sdb=56&chk=3

In one embodiment, integrity of the update may be determined. Accordingly, the update may be conditionally installed with the scanning subsystem, based on whether the integrity of the update is verified.

As an option, the integrity of the update may be determined utilizing a signature. Such signature may be received with one of the portions (i.e. a last portion) of the update. Then, the signature may be compared against another signature generated utilizing each of the portions of the update. Note operation 1710.

In one embodiment, the signature may be generated using a RSA private key and authenticated on the mobile communication device using a corresponding public key included in the update. The signature verification and generation may further be performed using a specified authentication library.

Assuming that the integrity is verified, any scanning being performed by the scanning subsystem is paused, or halted. Note operation 1712. It should be noted that such pausing may be optional.

Next, the update may be installed with the scanning subsystem. Note operation 1714. In the embodiment where any scanning is paused, the scanning may subsequently be resumed utilizing the scanning subsystem upon the update being installed with the scanning subsystem. See operation 1716.

To accommodate the limited bandwidth inherent in mobile communication frameworks, a size of the portions of the update may be minimized. Moreover, the portions of the update may be compressed.

In yet another embodiment, a format of each portion of the update may be designed to accommodate the limited bandwidth inherent in mobile communication frameworks. More information will now be set forth regarding such format.

Table #25 illustrates an exemplary format for downloading the portions of the update.

TABLE #25

MPKG
<part$_1$>
<part$_2$>
.
.
.

TABLE #25-continued

```
<part_n>
[signature:sig-len]
[sig-len:4]
```

Each of the foregoing parts set forth in Table #25 is defined as follows in Table #26.

TABLE #26

```
X-ContentLength: <part-length>\r\n
X-ContentName: <part-name>\r\n
X-Name: <component-name>\r\n
X-Version: <component-version>\r\n
\r\n
[part-data: part-length bytes]
```

Each part is made up of a header and data. Such header may indicate an identifier of the associated portion of the update, a length of the associated portion of the update, etc. Moreover, the header may specify the contained data name and length, and be separated from the actual data with an extra CR+LF pair. Table #27 sets forth exemplary data/content names associated with the header.

TABLE #27

| Component Name | Description |
|---|---|
| "pd" | detection logic |
| "sdb" | signature database update |

Table #28 illustrates an exemplary update package.

TABLE #28

```
MPKG
X-ContentLength: 6423\r\n
X-ContentName: update30__32\r\n
X-Name: sdb\r\n
X-Version: 32\r\n
\r\n
<SDB update binary:6423>
<signature:sig-len>
<sig-len:4>
```

Abstract Library API

As mentioned previously, a platform-independent system and associated method are provided for use with a mobile communication device. Included is a platform-independent scanning subsystem in communication with the operating system of a mobile communication device for scanning purposes. Further provided is a platform-independent application program interface for interfacing the operating system and the scanning subsystem. The platform-independent application program interface includes an abstract library for porting the platform-independent scanning subsystem to the mobile communication device and associated operating system.

By this design, the scanning subsystem may be platform-independent, and thus be capable of being implemented on any type of operating system/mobile communication device combination.

In one embodiment, the abstract library may support system initialization, library initialization, error functions, memory allocation, input/output (I/O), data authentication, synchronization, hypertext transfer protocol, shared memory, system time, device information, and debugging. More exemplary information relating to one optional implementation of the foregoing application program interface is set forth in Appendix A.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A system for scanning application program data utilizing a mobile communication device, comprising:
    an application program installed on a mobile communication device capable of communicating via a wireless network, the application program adapted for performing tasks utilizing the mobile communication device; and
    a scanning subsystem in communication with the application program for scanning application data relating to the tasks performed by the application program;
    wherein the application program communicates information relating to and in addition to the application data, to the scanning subsystem to facilitate the scanning by the scanning subsystem;
    wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages;
    wherein the information includes variables that relate to different types of the application data.

2. The system of claim 1, wherein the scanning includes on-demand virus scanning.

3. The system of claim 1, wherein the scanning includes on-access virus scanning.

4. The system of claim 1, wherein the application program includes a Java application program.

5. The system of claim 1, wherein the mobile communication device includes a cellular telephone.

6. The system of claim 1, wherein the types are selected from the group consisting of a hypertext mark-up language (HTML)-type, a uniform resource locator (URL)-type, an electronic mail-type, a telephone number-type, a Java-type, a text-type, and an unknown-type.

7. A The system of claim 1, wherein the types are selected from the group including a hypertext mark-up language (HTML)-type, a uniform resource locator (URL)-type, an electronic mail-type, a telephone number-type, a Java-type, a text-type, and an unknown-type.

8. The system of claim 1, wherein the information improves the timing of the scanning by the scanning subsystem.

9. The system of claim 1, wherein the information improves the accuracy of the scanning by the scanning subsystem.

10. The system of claim 1, wherein the application program is separate from the scanning subsystem.

11. A system for scanning application program data utilizing a mobile communication device, comprising:
    an application program installed on a mobile communication device capable of communicating via a wireless network, the application program adapted for performing tasks utilizing the mobile communication device; and
    a scanning subsystem in communication with the application program for scanning application data relating to the tasks performed by the application program;

wherein the application program communicates information relating to and in addition to the application data, to the scanning subsystem to facilitate the scanning by the scanning subsystem;

wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages:

wherein the information relates to different types of the application data;

wherein the information identifies a format associated with each of the types of the application data.

12. A system for scanning application program data utilizing a mobile communication device, comprising an application program installed on a mobile communication device capable of communicating via a wireless network, the application program adapted for performing tasks utilizing the mobile communication device; and a scanning subsystem in communication with the application program for scanning application data relating to the tasks performed by the application program;

wherein the application program communicates information relating to and in addition to the application data, to the scanning subsystem to facilitate the scanning by the scanning subsystem;

wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages;

wherein the information relates to different types of the application data;

wherein the information includes variables that relate to the different types of the application data.

13. A system for scanning application program data utilizing a mobile communication device, comprising:

an application program installed on a mobile communication device capable of communicating via a wireless network, the application program adapted for performing tasks utilizing the mobile communication device; and a scanning subsystem in communication with the application program for scanning application data relating to the tasks performed by the application program;

wherein the application program communicates information relating to and in addition to the application data, to the scanning subsystem to facilitate the scanning by the scanning subsystem;

wherein the application program is selected from the group consisting of a mail application program a browser application program, a phone book application program, a message application program, and a Java application, and the tasks are selected from the group consisting of managing electronic mail, browsing a network managing a plurality telephone numbers, and communicating messages;

wherein the information indicates a timing of the scanning by the scanning subsystem.

14. The system of claim 13, wherein the timing is relative to receipt of the application data.

15. The system of claim 13, wherein the timing is relative to storage of the application data.

16. The system of claim 13, wherein the timing is relative to of the application data.

17. The system of claim 13, wherein the timing is relative to invoking of the application data.

18. A system for scanning application program data utilizing a mobile communication device, comprising:

an application program installed on a mobile communication device capable of communicating via a wireless network, the application program adapted for performing tasks utilizing the mobile communication device; and a scanning subsystem in communication with the application program for scanning application data relating to the tasks performed by the application program;

wherein the application program communicates information relating to and in addition to the application data, to the scanning subsystem to facilitate the scanning by the scanning subsystem;

wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages;

wherein the information indicates whether the scanning by the scanning subsystem is optional.

19. A system for scanning application program data utilizing a mobile communication device, comprising:

an application program installed on a mobile communication device capable of communicating via a wireless network, the application program adapted for performing tasks utilizing the mobile communication device; and a scanning subsystem in communication with the application program for scanning application data relating to the tasks performed by the application program;

wherein the application program communicates information relating to and in addition to the application data, to the scanning subsystem to facilitate the scanning by the scanning subsystem;

wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages;

wherein the information indicates whether the scanning by the scanning subsystem is mandatory.

20. A system for scanning application program data utilizing a mobile communication device, comprising:

an application program means installed on a mobile communication device capable of communicating via a wireless network, the application program means adapted for performing tasks utilizing the mobile communication device; and a scanning subsystem means in communication with the application program means for scanning application data relating to the tasks performed by the application program means;

wherein the application program means communicates information relating to and in addition to the application data, to the scanning subsystem means to facilitate the scanning by the scanning subsystem means;

wherein the application program means includes a mail application program, a browser application program, a phone book application program, a message application program, and a Java application, and the tasks include managing electronic mail, browsing a network, managing a plurality telephone numbers, and communicating messages;

wherein the information indicates a timing of the scanning by the scanning subsystem.

21. A method for scanning application program data utilizing a mobile communication device, comprising:

performing tasks utilizing a mobile communication device with an application program installed thereon; and scanning application data relating to the tasks utilizing a scanning subsystem in communication with the application program;

wherein the application program communicates information relating to and in addition to the application data, to the scanning subsystem to facilitate the scanning by the scanning subsystem;

wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages;

wherein the information indicates a timing of the scanning by the scanning subsystem.

22. A computer program product for scanning application program data utilizing a mobile communication device, comprising:

computer code for performing tasks utilizing a mobile communication device with an application program installed thereon; and computer code for scanning application data relating to the tasks utilizing a scanning subsystem in communication with the application program;

wherein the application program communicates information relating to and in addition to the application data, to the scanning subsystem to facilitate the scanning by the scanning subsystem;

wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages;

wherein the information relates to different types of the application data selected from the group consisting of a hypertext mark-up language (HTML)-type, a uniform resource locator (URL)-type, an electronic mail-type, a telephone number-type, a Java-type, a text-type, and an unknown-type;

wherein the information identifies a format associated with each of the types of the application data;

wherein the information includes variables that relate to the different types of the application data;

wherein the information indicates a timing of the scanning by the scanning subsystem;

wherein the information indicates whether the scanning by the scanning subsystem is optional;

wherein the information indicates whether the scanning by the scanning subsystem is mandatory;

wherein the information improves the timing of the scanning by the scanning subsystem;

wherein the information improves the accuracy of the scanning by the scanning subsystem.

23. A system for scanning application program data utilizing a mobile communication device, comprising:

an application program installed on a mobile communication device capable of communicating via a wireless network, the application program adapted for performing tasks utilizing the mobile communication device; and a scanning subsystem in communication with the application program for scanning application data relating to the tasks performed by the application program;

wherein the application program communicates information relating to and in addition to the application data, to the scanning subsystem to facilitate the scanning by the scanning subsystem;

wherein the application program is selected from the group consisting of a mail application program, a browser application program, a phone book application program, a message application program, and a Java application, and the tasks are selected from the group consisting of managing electronic mail, browsing a network, managing a plurality telephone numbers, and communicating messages;

wherein the information includes a scanning subsystem action type, a scan data type, a data pointer to a scan target, a first function to retrieve a data size in bytes, a second function to resize scan data, a third function used by the scanning subsystem to retrieve a block of the scan data, a fourth function used to write to the scan data, and a fifth function for scanning subsystem status and progress reporting.

24. A system for scanning application program data utilizing a mobile communication device, comprising:

an application program installed on a mobile communication device capable of communicating via a wireless network, the application program adapted for performing tasks utilizing the mobile communication device; and a scanning subsystem in communication with the application program for scanning application data relating to the tasks performed by the application program;

wherein the application program communicates information relating to and in addition to the application data, to the scanning subsystem to facilitate the scanning by the scanning subsystem;

wherein the application program is selected from the group consisting of, a mail application program, a browser application program, a phone book application program, a message application program, and a Java application, and the tasks are selected from the group consisting of managing electronic mail, browsing a network, managing a plurality telephone numbers, and communicating messages;

wherein the mobile communication device includes an operating system installed thereon, the scanning subsystem includes a platform-independent scanning subsystem in communication with the operating system of the mobile communication device for scanning purposes, and the system further includes a platform-independent application program interface for interfacing the operating system and the scanning subsystem, the platform-independent application program interface including an abstract library for porting the platform-independent scanning subsystem to the mobile communication device and associated operating system.

* * * * *

UNITED STATES PATENT AND TRADEMARK OFFICE
CERTIFICATE OF CORRECTION

PATENT NO. : 6,987,963 B2
APPLICATION NO. : 10/639009
DATED : January 17, 2006
INVENTOR(S) : Victor Kouznetsov et al.

Page 1 of 1

It is certified that error appears in the above-identified patent and that said Letters Patent is hereby corrected as shown below:

In the claims:
col. 24, line 37 replace "1 ,wherein" with --1, wherein--;
col. 24, line 46 delete "A" before "The";
col. 25, line 12 replace "messages:" with --messages;--;
col. 25, line 18 replace "comprising" with --comprising:--;
col. 25, line 18 make a new line after "comprising" and before "an";
col. 25, line 57 replace "program" with --program,--;
col. 25, line 63 replace "network" with --network,--;
col. 26, line 2 insert --rendering-- before "of" and after "to";
col. 28 line 48 replace "of," with --of--.

Signed and Sealed this

Eighth Day of June, 2010

David J. Kappos
*Director of the United States Patent and Trademark Office*